US012063085B2

(12) United States Patent
Bai et al.

(10) Patent No.: US 12,063,085 B2
(45) Date of Patent: Aug. 13, 2024

(54) INDICATION TO UPDATE UPLINK AND DOWNLINK BEAMS

(71) Applicant: QUALCOMM Incorporated, San Diego, CA (US)

(72) Inventors: Tianyang Bai, Somerville, NJ (US); Yan Zhou, San Diego, CA (US); Kiran Venugopal, Raritan, NJ (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/119,710

(22) Filed: Dec. 11, 2020

(65) Prior Publication Data
US 2021/0184738 A1 Jun. 17, 2021

Related U.S. Application Data

(60) Provisional application No. 62/948,772, filed on Dec. 16, 2019.

(51) Int. Cl.
*H04B 7/06* (2006.01)
*H04L 5/00* (2006.01)
(Continued)

(52) U.S. Cl.
CPC ......... *H04B 7/0617* (2013.01); *H04L 5/0048* (2013.01); *H04W 72/20* (2023.01); *H04W 72/046* (2013.01)

(58) Field of Classification Search
CPC .... H04B 7/0617; H04B 7/088; H04B 7/0695; H04L 5/0048; H04L 27/261; H04L 5/001;
(Continued)

(56) References Cited

U.S. PATENT DOCUMENTS

2008/0184261 A1* 7/2008 Jun ..................... H04L 67/34
719/313
2017/0019243 A1* 1/2017 Ahn ..................... H04L 5/001
(Continued)

FOREIGN PATENT DOCUMENTS

WO 2019182429 A1 9/2019

OTHER PUBLICATIONS

U.S. Appl. No. 62/868,283, filed Jun. 28, 2019 (Year: 2019).*
(Continued)

*Primary Examiner* — Ian N Moore
*Assistant Examiner* — Sun Jong Kim
(74) *Attorney, Agent, or Firm* — QUALCOMM Incorporated

(57) ABSTRACT

Apparatus, methods, processing systems, and computer readable mediums enable L1 (physical layer) and L2 (medium access control (MAC) layer) inter-cell mobility. More specifically, rules and operations performed during L1/L2 based cell handover operations. A user equipment (UE) is configured to receive, from a network entity of a source cell via at least one of L1 or L2 signaling, a handover command for the UE to handover from the source cell to a target cell. The UE determines at least one transient period during which the UE is served by both the source cell and the target cell, and performs the handover while communicating with the source cell and target cell during the transient period.

24 Claims, 15 Drawing Sheets

(51) Int. Cl.
    *H04W 72/044* (2023.01)
    *H04W 72/20* (2023.01)
(58) Field of Classification Search
    CPC .............. H04L 5/0035; H04L 5/0094; H04W 72/0406; H04W 72/046; H04W 52/0206; Y02D 30/70
    See application file for complete search history.

(56) References Cited

U.S. PATENT DOCUMENTS

| | | | |
|---|---|---|---|
| 2017/0251518 A1* | 8/2017 | Agiwal | H04W 76/28 |
| 2018/0191418 A1* | 7/2018 | Xia | H04W 72/046 |
| 2018/0324678 A1* | 11/2018 | Chen | H04W 48/16 |
| 2019/0059129 A1* | 2/2019 | Luo | H04B 7/0695 |
| 2019/0103908 A1* | 4/2019 | Yu | H04W 72/046 |
| 2019/0141693 A1 | 5/2019 | Guo et al. | |
| 2019/0305837 A1* | 10/2019 | Onggosanusi | H04L 5/0057 |
| 2020/0413390 A1* | 12/2020 | Rahman | H04B 17/309 |
| 2021/0029650 A1* | 1/2021 | Cirik | H04W 52/146 |
| 2021/0044404 A1* | 2/2021 | Liu | H04L 5/0048 |
| 2021/0084640 A1* | 3/2021 | Kang | H04B 7/00 |
| 2021/0153209 A1* | 5/2021 | Guan | H04W 72/042 |
| 2021/0159966 A1* | 5/2021 | Xi | H04L 5/0023 |
| 2021/0185647 A1* | 6/2021 | Rahman | H04L 5/0053 |
| 2021/0352646 A1* | 11/2021 | Li | H04B 7/0695 |
| 2021/0391899 A1* | 12/2021 | Cao | H04B 17/373 |
| 2022/0021499 A1* | 1/2022 | Jiang | H04L 5/0048 |

OTHER PUBLICATIONS

U.S. Appl. No. 62/947,873, filed Dec. 13, 2019 (Year: 2019).*
International Search Report and Written Opinion—PCT/US2020/064724—ISA/EPO—Apr. 22, 2021.

* cited by examiner

```
TCI-State ::=         SEQUENCE {
    tci - StateId         TCI - StatedID,
    qcl - Type1           QCL - Info,
    qcl - Type2           QCL - Info                          Optional, - -
Need R
    nrofPTRS - Ports      ENUMERATED {n1, n2}
    OPTIONAL, - - Need R
    ...
}

QCL - Info ::=        SEQUENCE {
    cell                  ServCellIndex                       Optional, - -
Need R
    bwp - Id              BWP - Id                            Optional, - -
    Cond CSI - RS - Indicated
    referenceSignal       CHOICE {
        csi - rs              NZP - CSI - RS - ResourceId,
        ssb                   SSB - Index,
        csi - RS - for - tracking    NZP - CSI - RS - ResourceSetId
    },
    qcl - Type            ENUMERATED {typeA, typeB, typeC, typeD},
```

FIG. 7

INDICATION TO UPDATE UPLINK AND DOWNLINK BEAMS

CROSS-REFERENCE TO RELATED APPLICATION

This application claims benefit of and priority to U.S. Patent Application No. 62/948,772, filed Dec. 16, 2019, which is hereby assigned to the assignee hereof and hereby expressly incorporated by reference herein in its entirety as if fully set forth below and for all applicable purposes.

BACKGROUND

Field of the Disclosure

The present disclosure relates generally to communication systems, and more particularly, to methods and apparatus for indicating an update to be applied to uplink and downlink beams.

Description of Related Art

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-Advanced (LTE-A) network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, eNB, Next Generation Node B (gNB), etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a desire for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communications by a user equipment. The method generally includes receiving, from a network entity, signaling indicating an update to a pair of transmit and receive beams used by the UE for uplink and downlink transmissions, respectively, and processing at least one of uplink or downlink transmissions in accordance with the update.

Certain aspects provide a method for wireless communications by a network entity. The method generally includes sending, to a user equipment, signaling indicating an update to a pair of transmit and receive beams used by the UE for uplink and downlink transmissions, respectively, and processing at least one of uplink or downlink transmissions in accordance with the update.

Certain aspects provide an apparatus for wireless communication. The apparatus generally includes a memory and one or more processors coupled to the memory, the one or more processors and the memory being configured to: receive, from a network entity, signaling indicating an update to a pair of transmit and receive beams used by the UE for uplink and downlink transmissions, respectively, and processes at least one of uplink or downlink transmissions in accordance with the update.

Certain aspects provide an apparatus for wireless communication. The apparatus generally includes a memory and one or more processors coupled to the memory, the one or more processors and the memory being configured to send, to a user equipment, signaling indicating an update to a pair of transmit and receive beams used by the UE for uplink and downlink transmissions, respectively, and process at least one of uplink or downlink transmissions in accordance with the update.

Certain aspects provide for a computer readable medium having computer executable code stored thereon for wireless communication. The computer readable medium generally includes code for receiving, from a network entity, signaling indicating an update to a pair of transmit and receive beams used by the UE for uplink and downlink transmissions, respectively, and code for processing at least one of uplink or downlink transmissions in accordance with the update.

Certain aspects provide for a computer readable medium having computer executable code stored thereon for wireless communication. The computer readable medium generally includes code for sending, to a user equipment, signaling indicating an update to a pair of transmit and receive beams used by the UE for uplink and downlink transmissions, respectively, and code for processing at least one of uplink or downlink transmissions in accordance with the update.

Certain aspects provide an apparatus for wireless communication. The apparatus generally includes means for receiving, from a network entity, signaling indicating an update to a pair of transmit and receive beams used by the UE for uplink and downlink transmissions, respectively, and means for processing at least one of uplink or downlink transmissions in accordance with the update.

Certain aspects provide an apparatus for wireless communication. The apparatus generally includes means for sending, to a user equipment, signaling indicating an update to a pair of transmit and receive beams used by the UE for uplink and downlink transmissions, respectively, and means for processing at least one of uplink or downlink transmissions in accordance with the update.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 7 illustrates an example of transmission configuration indicator (TCI) state information used to signal quasi-colocation (QCL) information.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
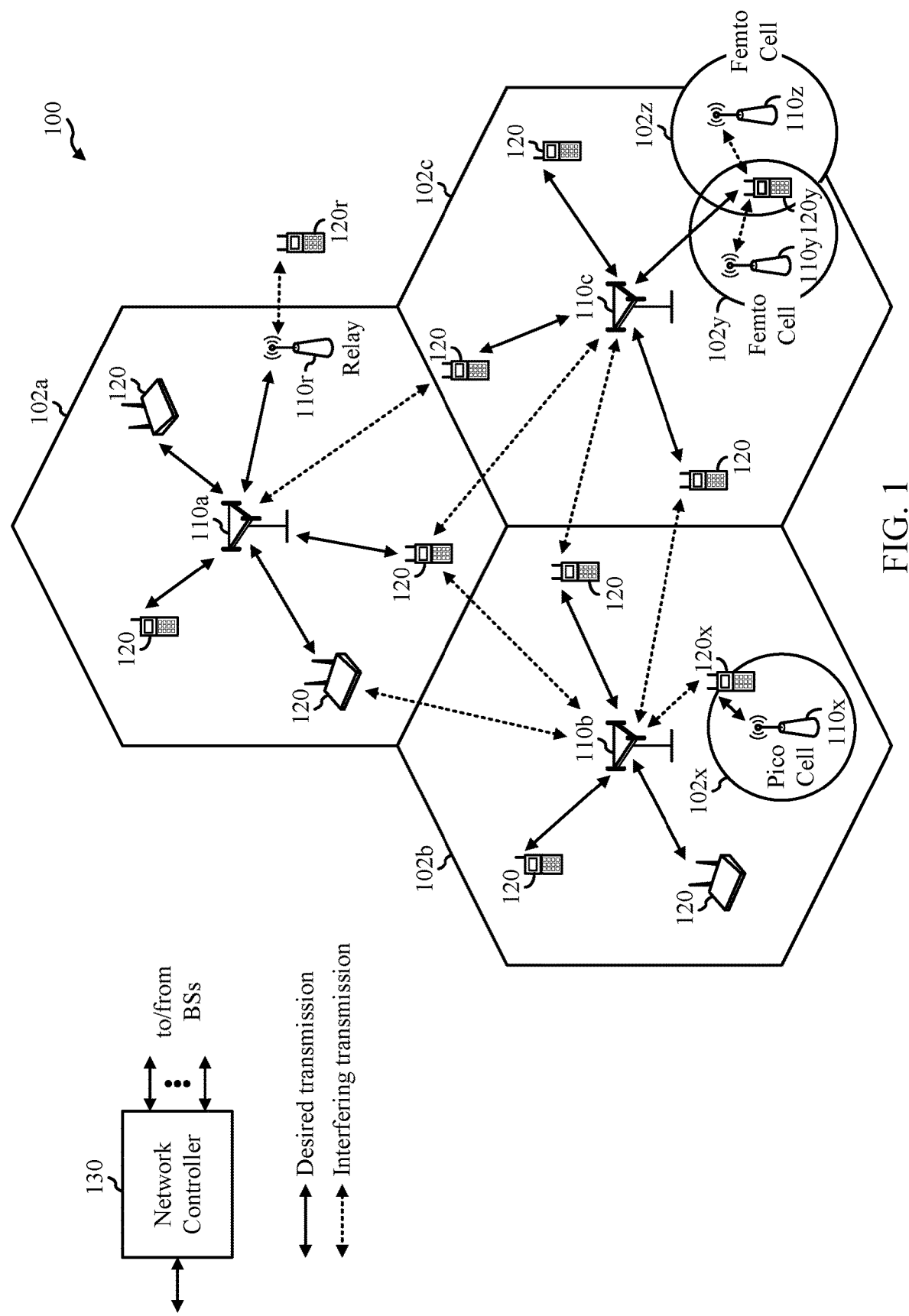
FIG. 1 is a block diagram conceptually illustrating an example telecommunications system, in which aspects of the present disclosure may be performed.

Aspects of the disclosure provide mechanisms for indicating an update to be (e.g., jointly) applied to uplink and downlink beams. The mechanisms may be applied for new radio (NR) (i.e., new radio access technology or 5G technology).

NR may support various wireless communication services, such as Enhanced mobile broadband (eMBB) targeting wide bandwidth (e.g. 80 MHz beyond), millimeter wave (mmWave) targeting high carrier frequency (e.g. 60 GHz), massive machine type communications (mMTC) targeting non-backward compatible machine type communication (MTC) techniques, and/or mission critical targeting ultra-reliable low latency communications (URLLC). These services may include latency and reliability requirements. These services may also have different transmission time intervals (TTI) to meet respective quality of service (QoS) requirements. In addition, these services may co-exist in the same subframe.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). "LTE" refers generally to LTE, LTE-Advanced (LTE-A), LTE in an unlicensed spectrum (LTE-whitespace), etc. The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100, such as a new radio (NR) or 5G network, in which aspects of the present disclosure may be performed. For example, the network 100 may include one or more user equipments (UEs) 120 configured to perform operations 1100 of FIG. 11. Similarly, the network 100 may include one or more base stations 110 configured to perform operations 1200 of FIG. 12.

As illustrated in FIG. 1, the wireless network 100 may include a number of base stations (BSs) 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and eNB, Node B, 5G NB, AP, NR BS, NR BS, gNB, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. ABS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may be coupled to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a healthcare device, a biometric sensor/device, a wearable device such as a smart watch, smart clothing, smart glasses, virtual reality goggles, a smart wrist band, smart jewelry (e.g., a smart ring, a smart bracelet, etc.), an entertainment device (e.g., a music device, a video device, a satellite radio, etc.), a vehicular component or sensor, a smart meter/sensor, a robot, a drone, industrial manufacturing equipment, a positioning device (e.g., GPS, Beidou, terrestrial), or any other suitable device that is configured to communicate via a wireless or wired medium. Some UEs may be considered machine-type communication (MTC) devices or evolved MTC (eMTC) devices, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. MTC and eMTC UEs include, for example, robots, drones, remote devices, sensors, meters, monitors, cameras, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. MTC UEs, as well as other UEs, may be implemented as Internet-of-Things (IoT) devices, e.g., narrowband IoT (NB-IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (e.g., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length (period) of 10 ms. Consequently, each subframe may have a length of 0.2 ms. In some cases, subframes may have a length (duration) of 1 ms and each subframe may be further divided into two slots of 0.5 ms each (e.g., with each slot containing 6 or 7 OFDM symbols depending on cyclic prefix (CP) length. A slot may be further divided into mini-slots, each mini-slot having a smaller duration (e.g., containing fewer symbols than a full slot). Each subframe may indicate a link direction (e.g., DL or UL) for data transmission and the link direction for each subframe may be dynamically switched. Each subframe may include DL/UL data as well as DL/UL control data. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., eNB, 5G Node B, Node B, transmission reception point (TRP), access point (AP)) may correspond to one or multiple BSs. NR cells can be configured as access cell (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
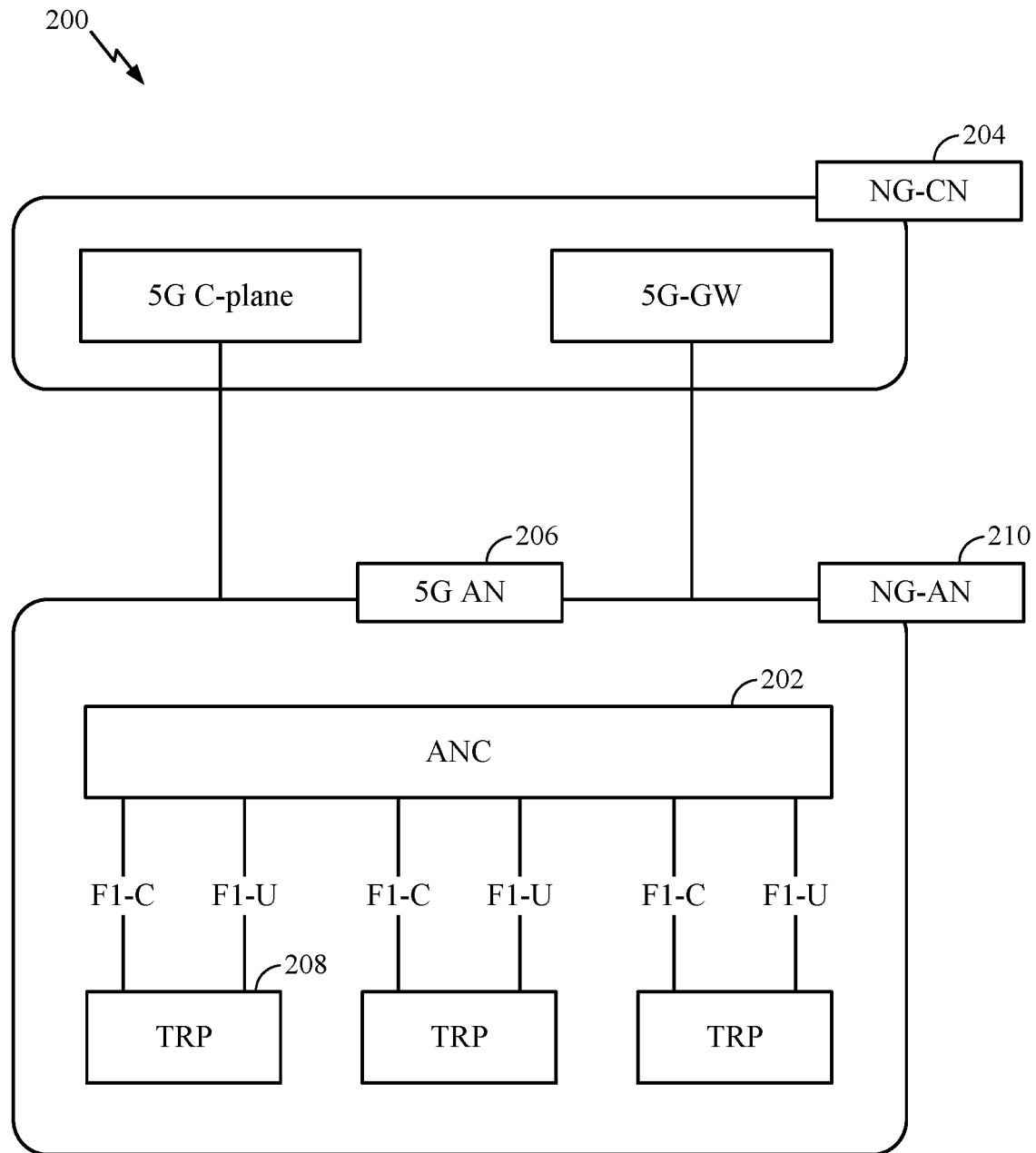
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, gNBs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local RAN architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
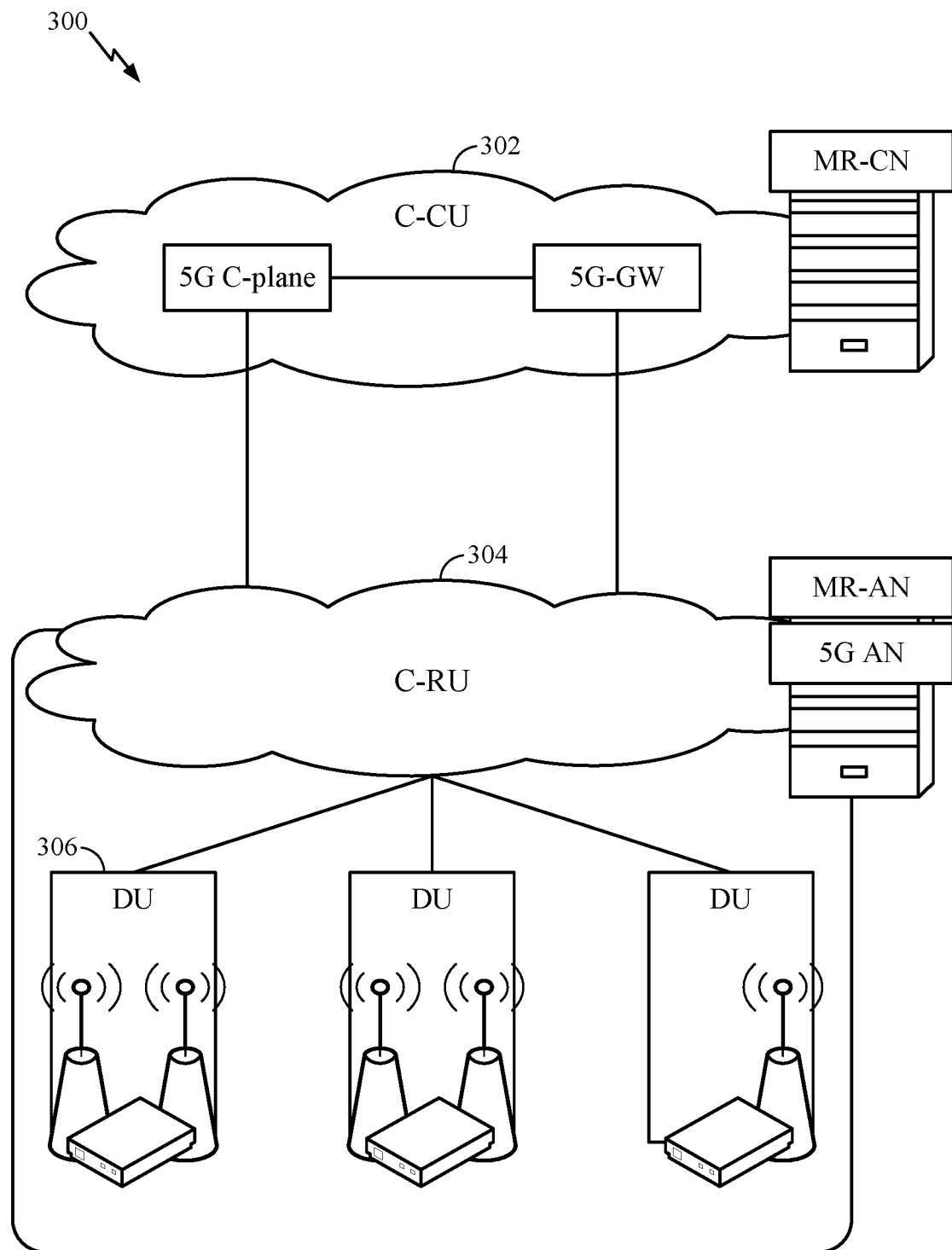
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
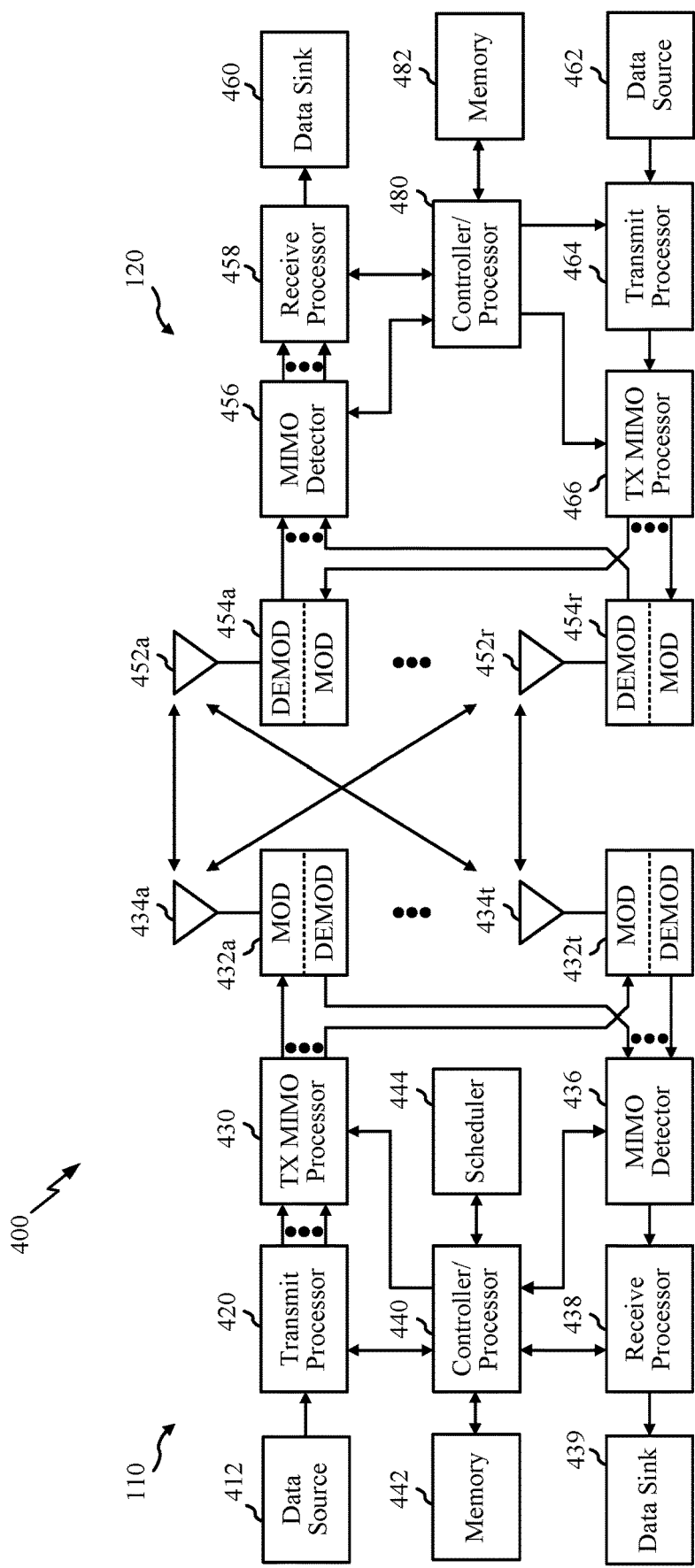
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. As described above, the BS may include a TRP. One or more components of the BS 110 and UE 120 may be used to practice aspects of the present disclosure. For example, antennas 452, processors 466, 458, 464, and/or controller/processor 480 (used to implement transceiver or separate receiver and transmitter chain functions) of the UE 120 may be used to perform operations 1100 of FIG. 11. Similarly, antennas 434, processors 430, 420, 438, and/or controller/processor 440 of the BS 110 may be used to perform operations 1200 of FIG. 12.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal. A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. For example, the TX MIMO processor 430 may perform certain aspects described herein for RS multiplexing. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. For example, MIMO detector 456 may provide detected RS transmitted using techniques described herein. A receive processor 458 may process (e.g., demodulate, deinterleave, and decode) the detected symbols, provide decoded data for the UE 120 to a data sink 460, and provide decoded control information to a controller/processor 480. According to one or more cases, CoMP aspects can include providing the antennas, as well as some Tx/Rx functionalities, such that they reside in distributed units. For example, some Tx/Rx processings can be done in the central unit, while other processing can be done at the distributed units. For example, in accordance with one or more aspects as shown in the diagram, the BS mod/demod 432 may be in the distributed units.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. As noted above, the processor 440 and/or other processors and modules at the base station 110 may perform or direct the processes for the techniques described herein with reference to FIG. 10. The processor 480 and/or other processors and modules at the UE 120 may also perform or direct processes for the techniques described herein with reference to FIG. 9. The memories 442 and 482 may store data and program codes for the BS 110 and the UE 120, respectively. A scheduler 444 may schedule UEs for data transmission on the downlink and/or uplink.

Figure 5:
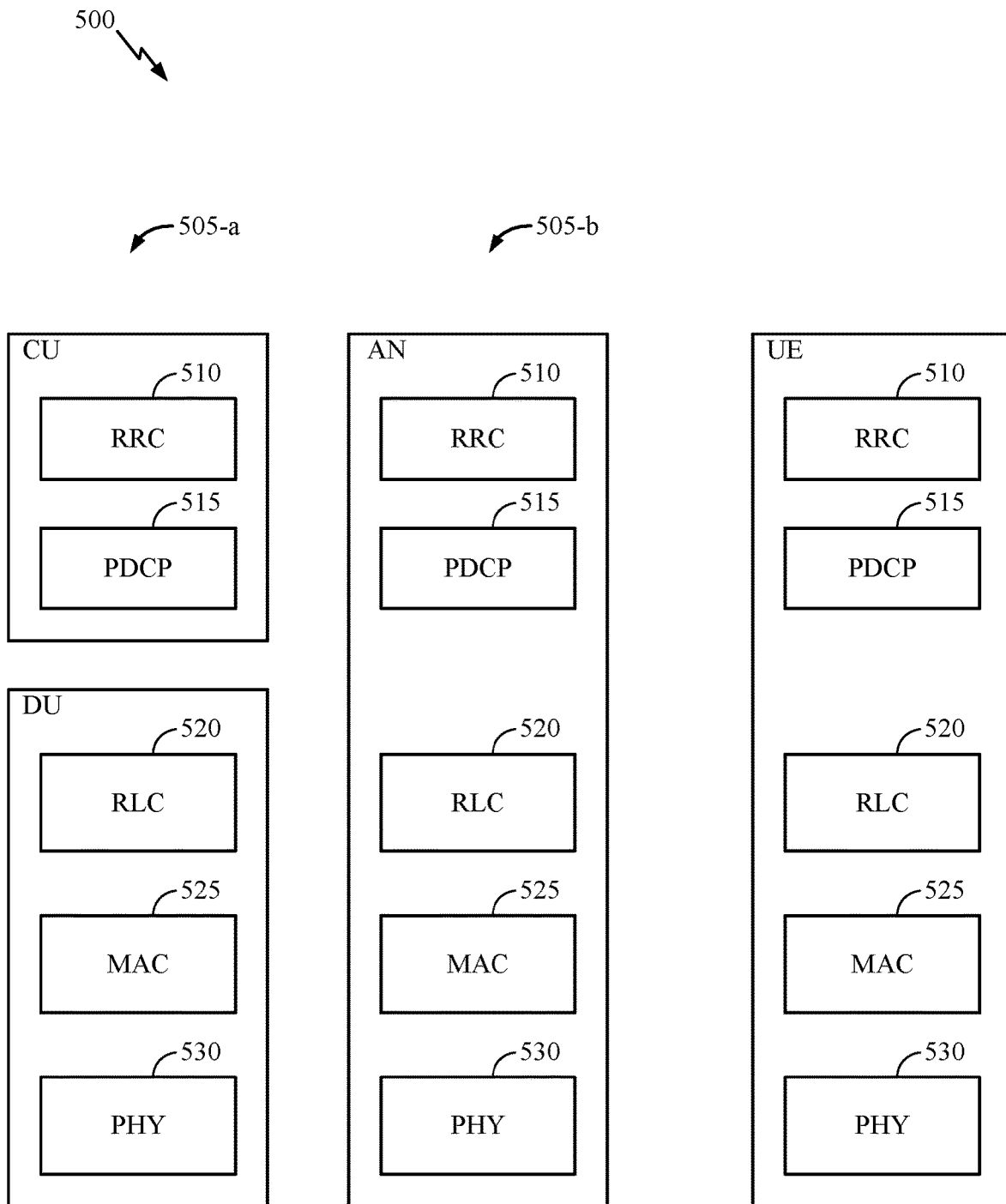
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
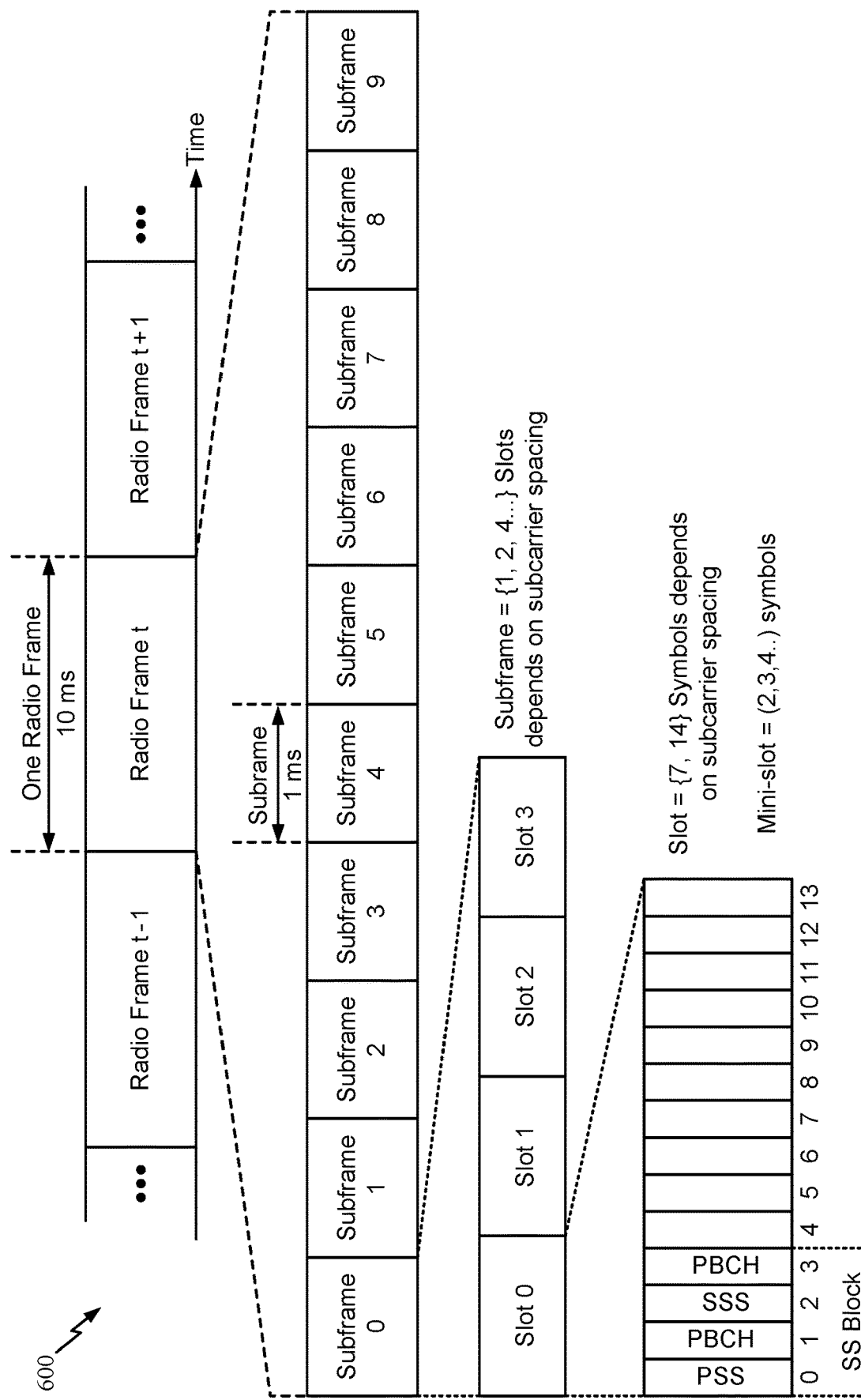
FIG. 6 illustrates an example of a frame format for a new radio (NR) system, in accordance with certain aspects of the present disclosure.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example QCL Signaling

In many cases, it is important for a UE to know which assumptions it can make on a channel corresponding to different transmissions. For example, the UE may need to know which reference signals it can use to estimate the channel in order to decode a transmitted signal (e.g., PDCCH or PDSCH). It may also be important for the UE to be able to report relevant channel state information (CSI) to the BS (e.g., gNB) for scheduling, link adaptation, and/or beam management purposes. In NR, the concept of quasi co-location (QCL) and transmission configuration indicator (TCI) states is used to convey information about these assumptions.

QCL assumptions are generally defined in terms of channel properties. Per 3GPP TS 38.214, "two antenna ports are said to be quasi-co-located if properties of the channel over which a symbol on one antenna port is conveyed can be inferred from the channel over which a symbol on the other antenna port is conveyed." Different reference signals may be considered quasi co-located ("QCL'd") if a receiver (e.g., a UE) can apply channel properties determined by detecting a first reference signal to help detect a second reference signal. TCI states generally include configurations such as QCL-relationships, for example, between the DL RSs in one CSI-RS set and the PDSCH DMRS ports.

In some cases, a UE may be configured with up to M TCI-States. Configuration of the M TCI-States can come about via higher layer signaling, while a UE may be signalled to decode PDSCH according to a detected PDCCH with DCI indicating one of the TCI states. For example, a particular TCI state may be indicated by an N bit DCI field for a PDSCH. Each configured TCI state may include one RS set TCI-RS-SetConfig that indicates different QCL assumptions between certain source and target signals.

In certain deployments, techniques are used to provide quasi-colocation (QCL) signaling for reference signals (RS) and channels across scenarios involving multiple cells, such as coordinated multipoint (CoMP) scenarios in which multiple transmit receive points (TRPs) or integrated access and backhaul (IAB) nodes each have their own cell ID.

FIG. 7 illustrates an example of how RSs associated with TCI states may be configured via radio resource control (RRC) signaling. QCL information and/or types may in some scenarios depend on or be a function of other information. For example, the quasi co-location (QCL) types indicated to the UE can be based on higher layer parameter QCL-Type and may take one or a combination of the following types:

QCL-TypeA: {Doppler shift, Doppler spread, average delay, delay spread},
QCL-TypeB: {Doppler shift, Doppler spread},
QCL-TypeC: {average delay, Doppler shift}, and
QCL-TypeD: {Spatial Rx parameter}, Spatial QCL assumptions (QCL-TypeD) may be used to help a UE to select an analog Rx beam (e.g., during beam management procedures). For example, an SSB resource indicator may indicate a same beam for a previous reference signal should be used for a subsequent transmission.

As illustrated in FIG. 7, the TCI states may indicate which RS are QCL'd and the QCL type. The TCI state may also indicate a ServCellIndex that is a short identity, used to identify a serving cell, such as a primary cell (PCell) or a secondary cell (Scell) in a carrier aggregation (CA) deployment. Value 0 for this field may indicate the PCell, while the SCellIndex that has previously been assigned may apply for SCells.

Figure 8:
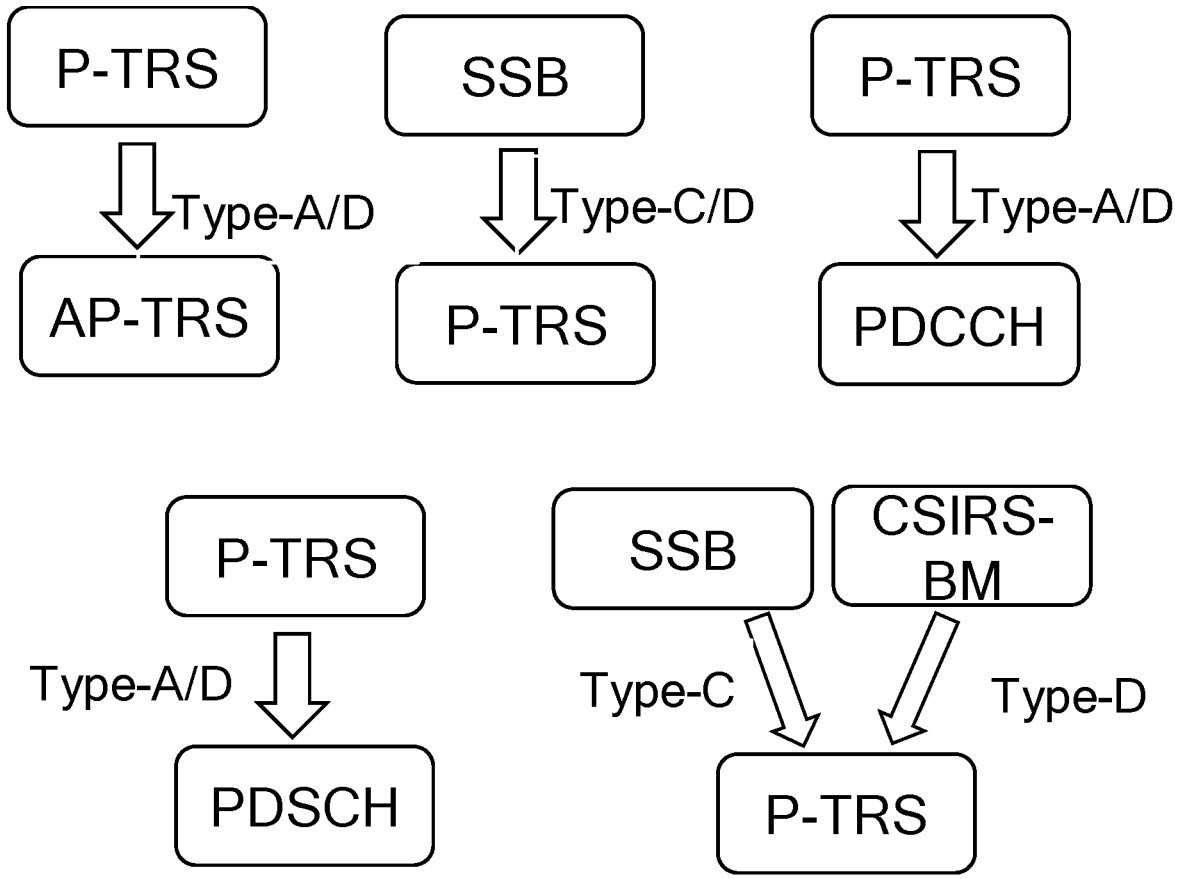
FIG. 8 graphically illustrates example QCL relationships between source and target reference signals.

FIG. 8 illustrates examples of the association of DL reference signals with corresponding QCL types that may be indicated by a TCI-RS-SetConfig.

In the examples of FIG. 8, a source reference signal (RS) is indicated in the top block and is associated with a target signal indicated in the bottom block. In this context, a target signal generally refers to a signal for which channel properties may be inferred by measuring those channel properties for an associated source signal. As noted above, a UE may use the source RS to determine various channel parameters, depending on the associated QCL type, and use those various channel properties (determined based on the source RS) to process the target signal. A target RS does not necessarily need to be PDSCH's DMRS, rather it can be any other RS: PUSCH DMRS, CSIRS, TRS, and sounding reference signal (SRS).

As illustrated, each TCI-RS-SetConfig contains parameters. These parameters can, for example, configure quasi co-location relationship(s) between reference signals in the RS set and the DM-RS port group of the PDSCH. The RS set contains a reference to either one or two DL RSs and an associated quasi co-location type (QCL-Type) for each one configured by the higher layer parameter QCL-Type.

As illustrated in FIG. 8, for the case of two DL RSs, the QCL types can take on a variety of arrangements. For example, QCL types may not be the same, regardless of whether the references are to the same DL RS or different DL RSs. In the illustrated example, SSB is associated with Type C QCL for P-TRS, while CSI-RS for beam management (CSIRS-BM) is associated with Type D QCL.

Figure 9:
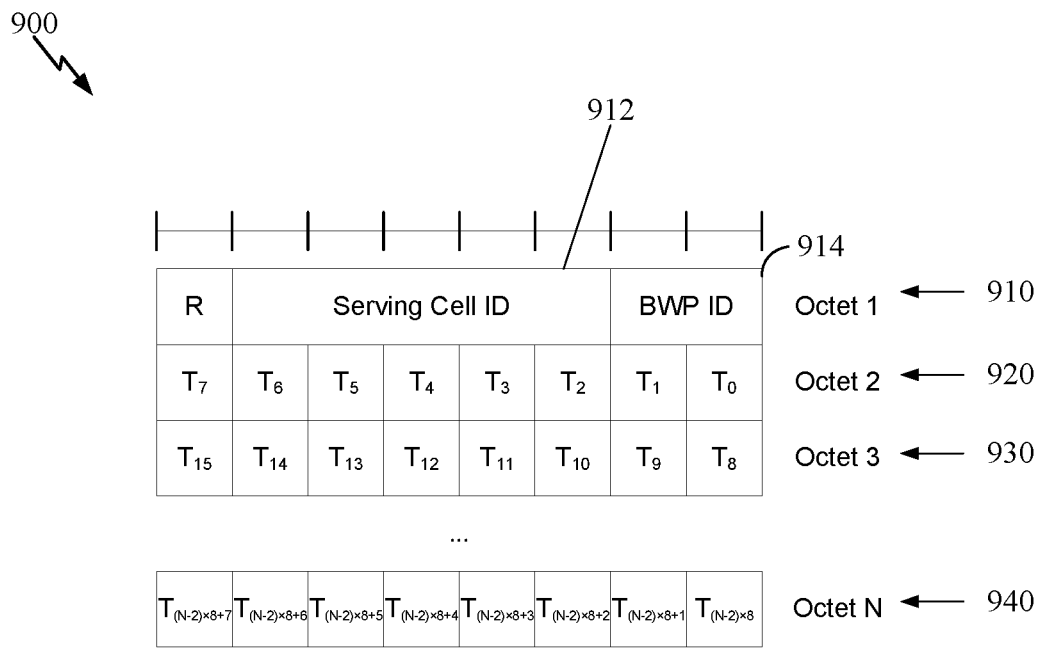
FIG. 9 illustrates an exemplary medium access control (MAC) control element (CE) for activating or deactivating TCI-states for a UE-specific physical channel.

FIG. 9 illustrates an exemplary medium access control (MAC) control element (CE) 900 for activating or deactivating TCI-states for a UE-specific physical downlink shared channel (PDSCH), according to previously known techniques (e.g., Rel-15). The exemplary MAC CE includes a plurality of octets 910, 920, 930, 940, etc. The first octet 910 includes a Serving Cell ID field 912, which is five bits long and indicates the identity of the serving cell for which the MAC CE applies. The first octet also includes a BWP ID field 914 that is two bits long and indicates a downlink (DL) bandwidth part (BWP) for which the MAC CE applies as the code point of the downlink control information (DCI) bandwidth part indicator field as specified in TS 38.212 (available from the 3GPP web site and other sources). The second octet 920 and later octets include bits indicating TCI states for the serving cell ID and BWP ID. For each $T_i$, if there is a TCI state with TCI-StateId i as specified in TS 38.331 (also available from 3GPP), then the corresponding $T_i$ field indicates the activation or deactivation status of the TCI state with TCI-StateId i, otherwise (i.e., there is not a TCI state with TCI-StateID i) the MAC entity ignores the $T_i$ field. The $T_i$ field is set to 1 to indicate that the TCI state with TCI-StateID i is activated and mapped to the code point of the DCI Transmission Configuration Indication field, as specified in TS 38.214 (available from 3GPP). The $T_i$ field is set to 0 to indicate that the TCI state with TCI-StateId i is deactivated and is not mapped to the code point of the DCI Transmission Configuration Indication field. The code point to which the TCI State is mapped is determined by its ordinal position among all the TCI States with $T_i$ field set to 1, i.e. the first TCI State with $T_i$ field set to 1 shall be mapped to the code point value 0, second TCI State with $T_i$ field set to 1 shall be mapped to the code point value 1, and so on. The maximum number of activated TCI states may be 8.

Figure 10:
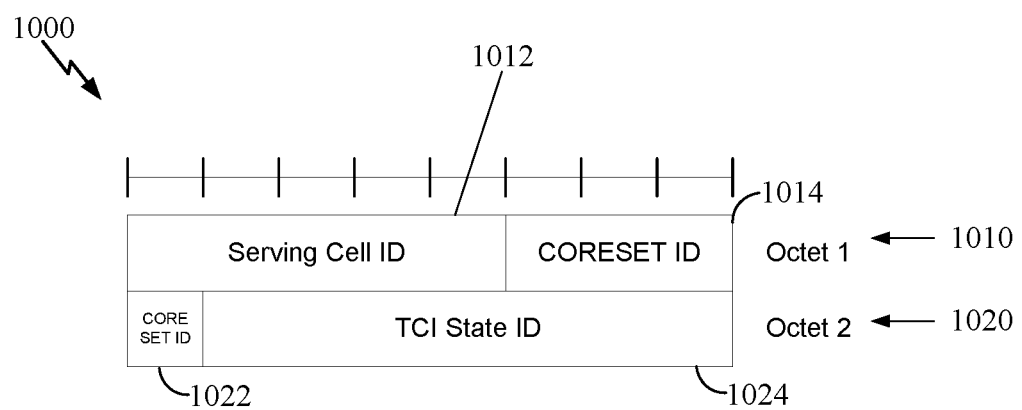
FIG. 10 illustrates an exemplary MAC CE for activating or deactivating a TCI-state for a physical downlink control channel (PDCCH).

FIG. 10 illustrates an exemplary MAC CE 1000 for activating or deactivating a TCI-state for a PDCCH, according to previously known techniques (e.g., Rel-15). The first octet 1010 includes a Serving Cell ID field 1012 that is five bits long and indicates the identity of the serving cell for which the MAC CE applies. The last three bits 1014 and the first bit 1022 of the second octet 1020 make up the CORESET ID field, which is four bits long and indicates a control resource set (CORESET) identified with ControlResourceSetId (e.g., as specified in TS 38.331, available from 3GPP), for which the TCI State is being indicated. If the value of the field is 0, then the field refers to the control resource set configured by controlResourceSetZero (e.g., as specified in TS 38.331). The second octet 1020 includes a TCI State ID field which is seven bits long and indicates the TCI state identified by TCI-StateId (e.g., as specified in TS 38.331) applicable to the control resource set identified by the CORESET ID field. If the value of the CORESET ID field is set to 0, then the TCI State ID field indicates a TCI-StateId for a TCI state of the first 64 TCI-states configured by tci-States-ToAddModList and tci-States-ToReleaseList in the PDSCH-Config in the active BWP. If the value of the CORESET ID field is set to a value other than 0, then the TCI State ID field indicates a TCI-StateId configured by tci-StatesPDCCH-ToAddList and tci-StatesPDCCH-ToReleaseList in the controlResourceSet identified by the indicated CORESET ID.

Example Indication to Jointly Update Uplink and Downlink Beams

Aspects of the disclosure provide mechanisms for indicating an update to be applied to both uplink (UL) and downlink (DL) beams.

The techniques presented herein may help reduce signaling overhead and/or latency by applying a common beam operation across both uplink and downlink control and data. In conventional systems, the spatial information (e.g., regarding beams to use) for UL and transmission configuration indication (TCI) state for DL are updated by different types of medium access (MAC) control element (MAC-CE) or radio resource control (RRC) signaling. Aspects of the present disclosure, however, may reduce overhead and/or latency by allowing for joint updates (e.g., simultaneous applied or otherwise applied together) when the UL and DL beam correspond to the same spatial filter.

As noted above, in a mmWave system, both the UE and gNB apply directional beamforming, where the UE and gNB communicate via beam pair link. Beams used for the UL data (transmit beams), DL data (receive beams), and control signals are typically configured in accordance with certain parameters. Such parameters may include, among other things, TCI states and spatial information. In one example, the uplink beams are typically configured via DL TCI states, while uplink beams are typically configured via spatial relationship information. In one example, the uplink beams may be configured based on uplink TCI states. In some cases, the TCI and spatial information are configured using different signaling.

UL beams and DL beams may be paired where they are used or updated at the same time. For example, if a UE has uplink and downlink beam correspondence, the UL transmission beam and DL reception beam may receive the signal from the same direction (e.g., to/from the same gNb). The UL and DL beams may share the same spatial filter. In some cases, where a UE may not have uplink and downlink beam correspondence, one or more UL transmission beams and one or more DL reception beams may be paired, for example, if they map to the same gNB beam. In such cases, aspects of the disclosure may help reduce signaling overhead and/or latency, by applying a common beam operation across both uplink and downlink control and data. According to certain aspects of the present disclosure, there are various options to implement such common beam operations.

For example, in a first case, a single signalling transmission (e.g., DCI or MAC-CE) may signal a joint update of downlink TCI ID and an uplink spatial relation ID. The downlink TCI ID may be determined from one or more target downlink signals. The uplink spatial relation ID may be determined from one or more target uplink signals. Alternatively, the selected uplink signal may be an uplink TCI ID. The target downlink signals may include, for example, one or more of a physical downlink control channel (PDCCH), physical downlink shared channel (PDSCH), or channel state information (CSI) reference signal (CSI-RS). The target uplink signals may include one or more of PUCCH, PUSCH, SRS, or PRACH.

In some cases, in accordance with the first case, both a downlink beam ID and an uplink beam ID may be included in a single signaling (e.g., a single DCI and/or single MAC-CE) to update both beams together. In other cases, a DL TCI ID and UL beam ID may be first grouped together, and then assigned a group ID. This group ID may be indicated in the group common signaling (DCI/MAC-CE).

In a second case, a DCI transmission may update TCI states of resources allotted to a reference signal (RS). The RS may serve as a quasi co-location (QCL) source RS for both a DL TCI of one or more target DL signals and an UL spatial relation (or UL TCI) of one or more target UL signals. In one example, the resources may be for semi-persistent (SP) or aperiodic (AP) CSI-RS and/or SRS resources. In this manner, a single DCI can update the common beam for multiple downlink and uplink signals.

In some cases, in accordance with the second case, downlink target signals (e.g., PDSCH/PDCCH/CSI-RS) may be linked to a TCI state. The TCI state may indicate the gNB beam will transmit the data and/or the control signal. In some cases, in a TCI state configuration, the TCI state may be linked to a source RS (e.g., CSI-RS, synchronization signal block (SSB), or sounding reference signal (SRS)), such that UE knows that the beam of the TCI state can be received using the same path as when receiving the associated transmission (CSI-RS/SSB/or SRS). A similar link between a TCI state and a source RS may apply on an uplink beam (e.g., PUCCH/PUSCH→SpatialRelation Info→CSI-RS/SSB/SRS). In such cases, if a source RS of a DL TCI and UL SRS resource indicator (SRI) are equivalent (e.g., semi-persistent/SP or aperiodic/AP CSI-RS and/or SRS), then the source RS TCI state information may be updated to effectively update the corresponding uplink and downlink beams. In cases where DCI is used (as opposed to a MAC-CE), then latency may be reduced, which may help in certain scenarios (e.g., ultra-reliable low-latency connectivity (URLLC)).

In a third case, a common beam may be indicated to a group of DL/UL resources. In one example, a gNB may indicate a group of DL/UL resources sharing a common beam via RRC/MAC-CE/DCI. In another example, RRC signalling may configure a resource group ID either per DL/UL resource in the group or for a list of DL/UL resources in the group. A group ID may be a common beam indication or a resource ID whose beam serves as common beam. For example, a CSI-RS resource ID No. 1 and SRS resource ID No. 2 may follow a common beam of a CORESET ID No. 3.

In some cases, in accordance with the second case, DL/UL resources may be grouped together (e.g., CSI-RS and SRS resources grouped together) and assigned a group resource ID. The group resource can be mapped to a common beam indicator, and signaling can update the common beam indicator, which may serve to update UL/DL beam at the same time.

Figure 11:
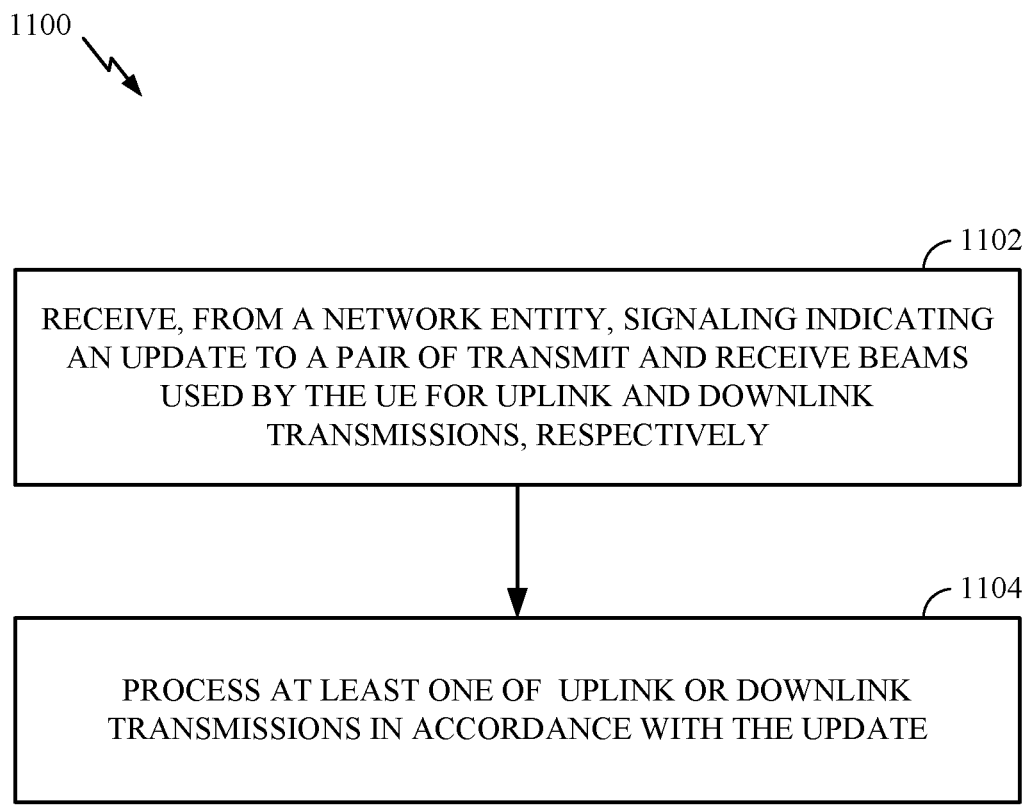
FIG. 11 illustrates example operations for wireless communications by a user equipment (UE), in accordance with aspects of the present disclosure.

FIG. 11 is a flow diagram illustrating example operations 1100 for wireless communication, in accordance with certain aspects of the present disclosure. The operations 1100 may be performed, for example, by a UE (e.g., such as the UE 120a in the wireless communication network 100). The operations 1100 may be implemented as software components that are executed and run on one or more processors (e.g., controller/processor 480 of FIG. 4). Further, the transmission and reception of signals by the UE in operations 1100 may be enabled, for example, by one or more antennas (e.g., antennas 452 of FIG. 4). In certain aspects, the transmission and/or reception of signals by the UE may be implemented via a bus interface of one or more processors (e.g., controller/processor 480) obtaining and/or outputting signals.

Operations 1100 begin at 1102, by receiving, from a network entity, signaling indicating an update to a pair of transmit and receive beams used by the UE for uplink and downlink transmissions, respectively. Signaling from the network entity to a UE may indicate beam update procedures from any of the above common beam operations described above, consistent with parameters such as TCI state or spatial relation.

The signaling may comprise a single DCI or MAC CE that indicates an update to the receive beam via a downlink TCI ID of one or more target downlink signals, and an update to the transmit beam via an uplink spatial relation ID or an uplink TCI ID of one or more target uplink signals. The target downlink signals may comprise at least one of a PDSCH, a PDCCH, or a CSI-RS, and the target uplink signals comprise at least one of a PUSCH, a PUCCH, a SRS, or a PRACH. The single DCI or MAC CE may indicate both an ID of the receive beam and an ID of the transmit beam. In one example, receiving signaling indicating a downlink TCI ID and UL beam ID may be grouped together and assigned a group ID, wherein the DCI or MAC CE indicates the group ID. A group ID may be a common beam indication, an UL/DL resource, or a resource ID whose beam serves as common beam.

The signaling may comprise a DCI that updates a downlink TCI of at least one RS resource that serves as a QCL source RS in both a downlink TCI of one or more target downlink signals and an uplink spatial relation or uplink TCI of one or more target uplink signals. The target downlink signals may comprise at least one of a PDSCH, a PDCCH, or a CSI-RS linked to a TCI state which indicates a beam the network entity will use to transmit the target downlink signals. The TCI state may be linked to at least one of a CSI-RS, SSB, or sounding reference signal that serves as a source RS of the TCI. The target uplink signals may comprise at least one of a PUSCH or a PUCCH linked to a TCI state which indicates a beam the network entity will use to transmit one or more source reference signals. The TCI state may be linked to at least one of a CSI-RS, SSB, or sounding reference signal that serves as a source RS of the TCI.

In one example, the signaling may comprise at least one of a DCI, RRC signaling, or MAC CE that updates a common beam for a set of downlink and uplink resources. The group of downlink and uplink resources may be indicated via at least one of RRC signaling, MAC CE, or a DCI. The group of downlink and uplink resources may be identified by at least one of a group ID or a resource ID whose beam serves as the common beam for resources having the same resource ID.

In one example, the signaling may be provided via a WUS, and the UE may be configured to apply the update in one or more ON durations after the WUS. A UE may send signaling, to the network entity, indicating capability of the UE to support update to the pair of transmit and receive beams according to one or more options, and receive signaling, from the network entity, indicating enablement of one or more of the options. The enablement may be signaled via at least one of RRC signaling, MAC CE, or a DCI.

At 1104, the UE processes at least one of uplink or downlink transmissions in accordance with the update.

Figure 12:
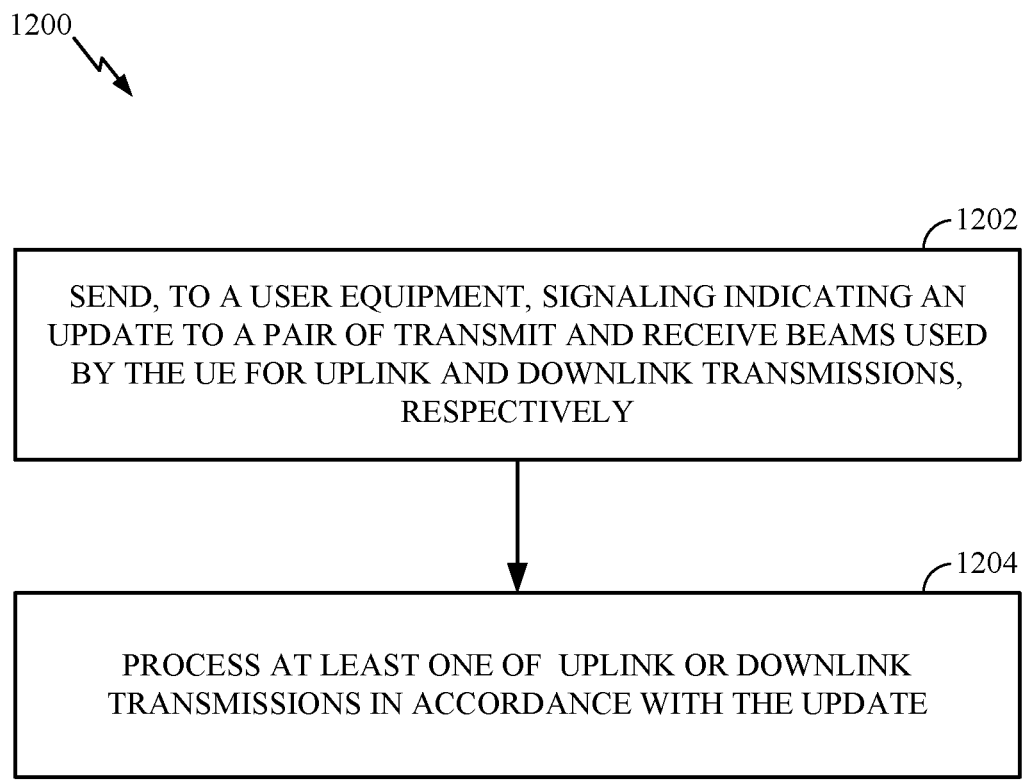
FIG. 12 illustrates example operations for wireless communications by a network entity, in accordance with aspects of the present disclosure.

FIG. 12 is a flow diagram illustrating example operations 1200 for wireless communication, in accordance with certain aspects of the present disclosure. The operations 1200 may be performed, for example, by a BS (e.g., such as the BS 110a in the wireless communication network 100). The operations 1200 may be complementary to the operations 1200 performed by the UE. The operations 1200 may be implemented as software components that are executed and run on one or more processors (e.g., controller/processor 440 of FIG. 4). Further, the transmission and reception of signals by the BS in operations 1200 may be enabled, for example, by one or more antennas (e.g., antennas 434 of FIG. 4). In certain aspects, the transmission and/or reception of signals by the BS may be implemented via a bus interface of one or more processors (e.g., controller/processor 440) obtaining and/or outputting signals Operations 1200 begin, at 1202, by sending, to a user equipment, signaling indicating an update to a pair of transmit and receive beams used by the UE for uplink and downlink transmissions, respectively. Signaling from the network entity to a UE may indicate beam update procedures from any of the above common beam operations described above, consistent with parameters such as TCI state or spatial relation.

The signaling may comprise a single DCI or MAC CE that indicates an update to the receive beam via a downlink TCI ID of one or more target downlink signals, and an update to the transmit beam via an uplink spatial relation ID or an uplink TCI ID of one or more target uplink signals. The target downlink signals may comprise at least one of a PDSCH, a PDCCH, or a CSI-RS, and the target uplink signals may comprise at least one of a PUSCH, a PUCCH, a SRS, or a PRACH. The single DCI or MAC CE may indicate both an ID of the receive beam and an ID of the transmit beam. In one example, a BS may transmit signaling, to the UE, indicating a downlink TCI ID and UL beam ID are grouped together and assigned a group ID, wherein the DCI or MAC CE indicates the group ID. A group ID may be a common beam indication, an UL/DL resource, or a resource ID whose beam serves as common beam.

In one example, the signaling may comprise a DCI that updates a downlink TCI of at least one RS resource that serves as a QCL source RS in both a downlink TCI of one or more target downlink signals and an uplink spatial relation or uplink TCI of one or more target uplink signals. The target downlink signals may comprise at least one of a PDSCH, a PDCCH, or a CSI-RS linked to a TCI state which indicates a beam the network entity will use to transmit the target downlink signals. The TCI state may be linked to at least one of a CSI-RS, SSB, or sounding reference signal that serves as a source RS of the TCI. The target uplink signals may comprise at least one of a PUSCH or a PUCCH linked to a TCI state which indicates a beam the network entity will use to transmit one or more source reference signals. The TCI state may be linked to at least one of a CSI-RS, SSB, or sounding reference signal that serves as a source RS of the TCI.

In one example, the signaling may comprise at least one of a DCI, RRC signaling, or MAC CE that updates a common beam for a set of downlink and uplink resources. The group of downlink and uplink resources may be indicated via at least one of RRC signaling, MAC CE, or a DCI. The group of downlink and uplink resources may be identified by at least one of a group ID or a resource ID whose beam serves as the common beam for resources having the same resource ID.

In one example, the signaling is provided via a WUS, and the UE may be configured to apply the update in one or more ON durations after the WUS.

In one example, the BS may receive signaling, from the UE, indicating capability of the UE to support update to the pair of transmit and receive beams according to one or more options, and send signaling, to the UE, indicating enablement of one or more of the options. The enablement may be signaled via at least one of RRC signaling, MAC CE, or a DCI.

At 1204, the network entity processes at least one of uplink or downlink transmissions in accordance with the update.

Operations 1100 and 1200 may help further reduce overhead and/or latency by effectively utilizing common beam operations (to update beam information) across DL and UL control and data channels. Any of the above cases may be implemented to utilize common beam operations.

Figure 13:
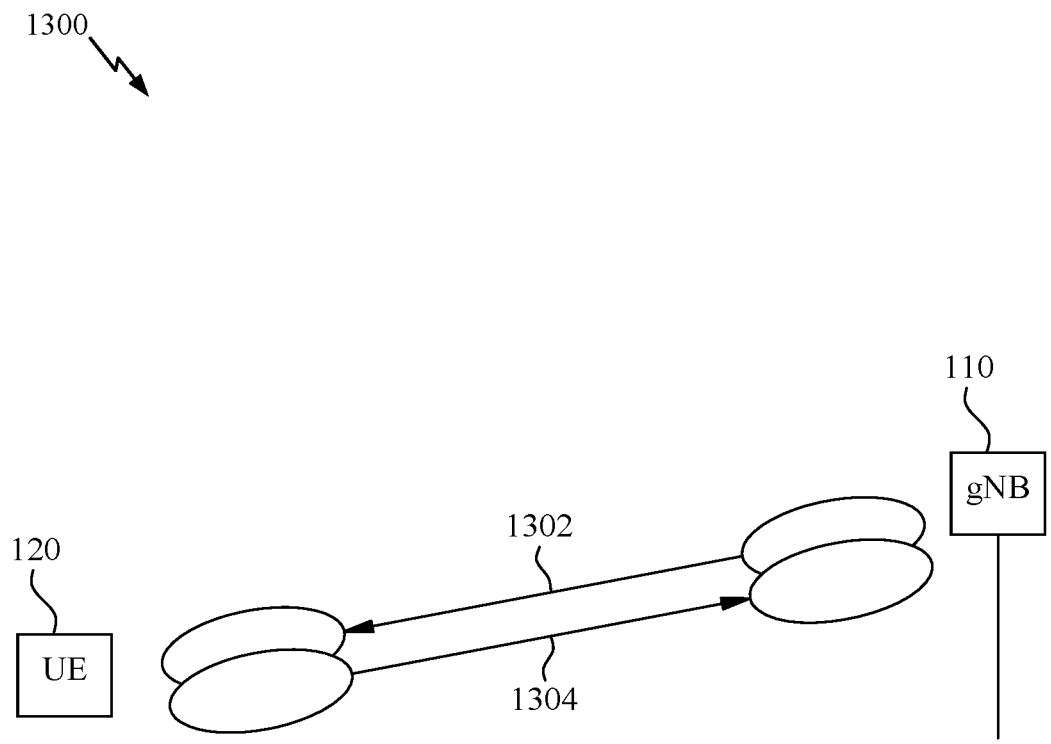
FIG. 13 illustrates an example common beam operation for uplink and downlink beams.

FIG. 13 illustrates an example common beam operation 1300 for uplink and downlink beams. Here, UL beam 1304 and DL beam 1302 may be paired for common beam operation where they are used or updated at the same time. If UE 120 has uplink and downlink beam correspondence, the UL beam 1304 and DL beam 1302 may receive a signal from the same network entity 110. The UL beam 1304 and DL beam 1302 may also share the same spatial filter. UL beam 1304 and DL beam 1302 may be paired for common beam operation if they map to the same network entity 110 beam. In one example, common beam operation 1300 may describe a single signalling transmission (e.g., DCI or MAC-CE) indicating a joint update of downlink 1302 TCI ID and an uplink 1304 spatial relation ID. In some cases, both a downlink beam 1302 ID and an uplink beam 1304 ID may be included in a single signaling (e.g., a single DCI and/or single MAC-CE) to update both beams together. In other cases, a DL TCI ID and UL beam ID may be first grouped together, and then assigned a group ID. This group ID may be indicated in the group common signaling (DCI/MAC-CE).

Figure 14:
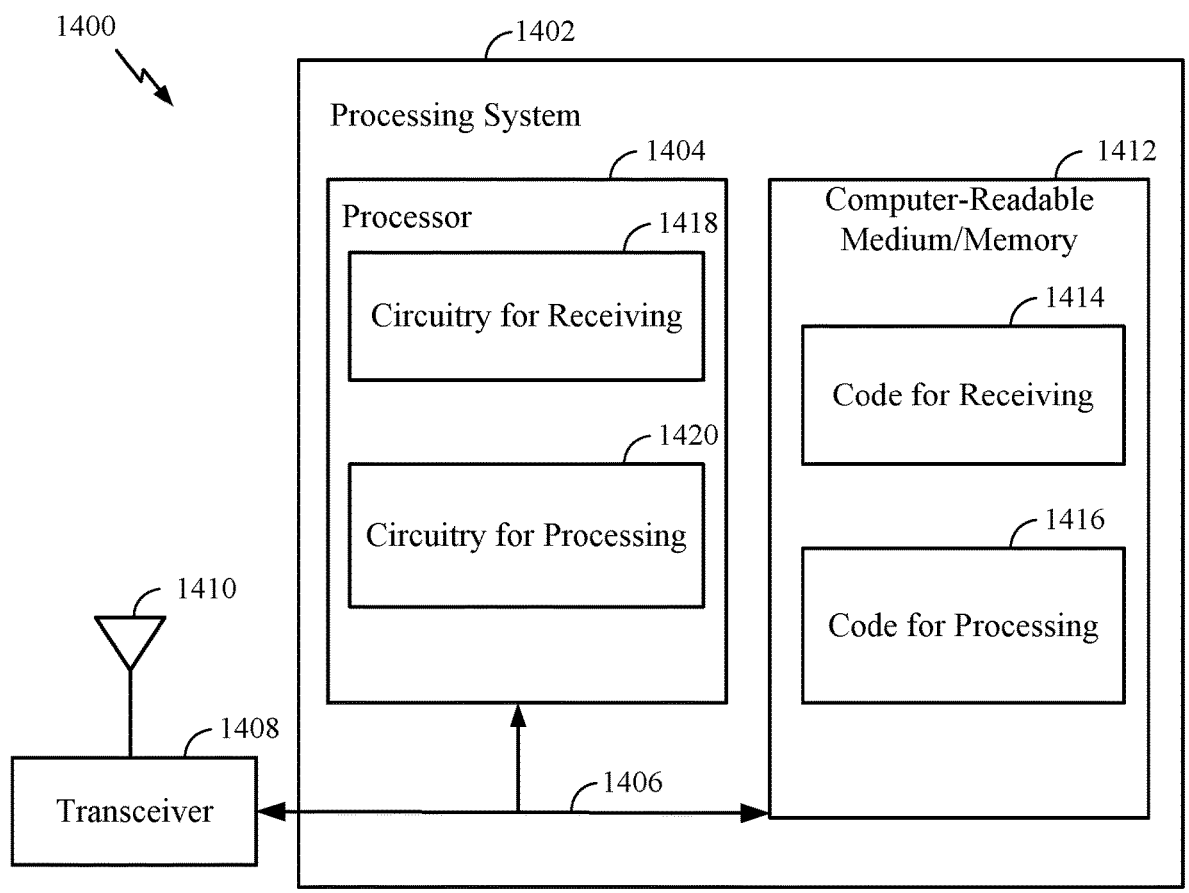
FIG. 14 illustrates a communications device that may include various components configured to perform operations for the techniques disclosed herein in accordance with aspects of the present disclosure.

FIG. 14 illustrates a communications device 1400 that may include various components (e.g., corresponding to means-plus-function components) configured to perform operations for the techniques disclosed herein, such as the operations illustrated in FIG. 11. The communications device 1400 includes a processing system 1402 coupled to a transceiver 1408 (e.g., a transmitter and/or a receiver). The transceiver 1408 is configured to transmit and receive signals for the communications device 1400 via an antenna 1410, such as the various signals as described herein. The processing system 1402 may be configured to perform processing functions for the communications device 1400, including processing signals received and/or to be transmitted by the communications device 1400.

The processing system 1402 includes a processor 1404 coupled to a computer-readable medium/memory 1412 via a bus 1406. In certain aspects, the computer-readable medium/memory 1412 is configured to store instructions (e.g., computer-executable code) that when executed by the processor 1404, cause the processor 1404 to perform the operations illustrated in FIG. 11, or other operations for performing the various techniques discussed herein for an indication to update uplink and downlink beams. In certain aspects, computer-readable medium/memory 1412 stores code 1414 for receiving, from a network entity, signaling indicating an update to a pair of transmit and receive beams used by the UE for uplink and downlink transmissions, respectively; and code 1416 for processing at least one of uplink or downlink transmissions in accordance with the update. In certain aspects, the processor 1404 has circuitry configured to implement the code stored in the computer-readable medium/memory 1412. The processor 1404 includes circuitry 1418 for receiving, from a network entity, signaling indicating an update to a pair of transmit and receive beams used by the UE for uplink and downlink transmissions, respectively; and circuitry 1420 for processing at least one of uplink or downlink transmissions in accordance with the update.

For example, means for transmitting (or means for outputting for transmission) may include a transmitter and/or an antenna(s) 434 or the BS 110a or the transmitter unit 454 and/or antenna(s) 452 of the UE 120a illustrated in FIG. 4 and/or circuitry 1418/1420 of the communication device 1400 in FIG. 14. Means for receiving (or means for obtaining) may include a receiver and/or an antenna(s) 434 of the BS 110a or a receiver and/or antenna(s) 452 of the UE 120a illustrated in FIG. 4 and/or circuitry 1418/1420 of the communication device 1400 in FIG. 14. Means for communicating may include a transmitter, a receiver or both. Means for generating, means for performing, means for determining, means for taking action, means for determining, means for coordinating, and/or means for processing may include a processing system, which may include one or more processors, such as the transmit processor 420, the TX MIMO processor 430, the receive processor 438, and/or the controller/processor 440 of the BS 110a or the receive processor 458, the transmit processor 464, the TX MIMO processor 466, and/or the controller/processor 480 of the UE 120a illustrated in FIG. 4 and/or the processing system 1402 of the communication device 1400 in FIG. 14.

Figure 15:
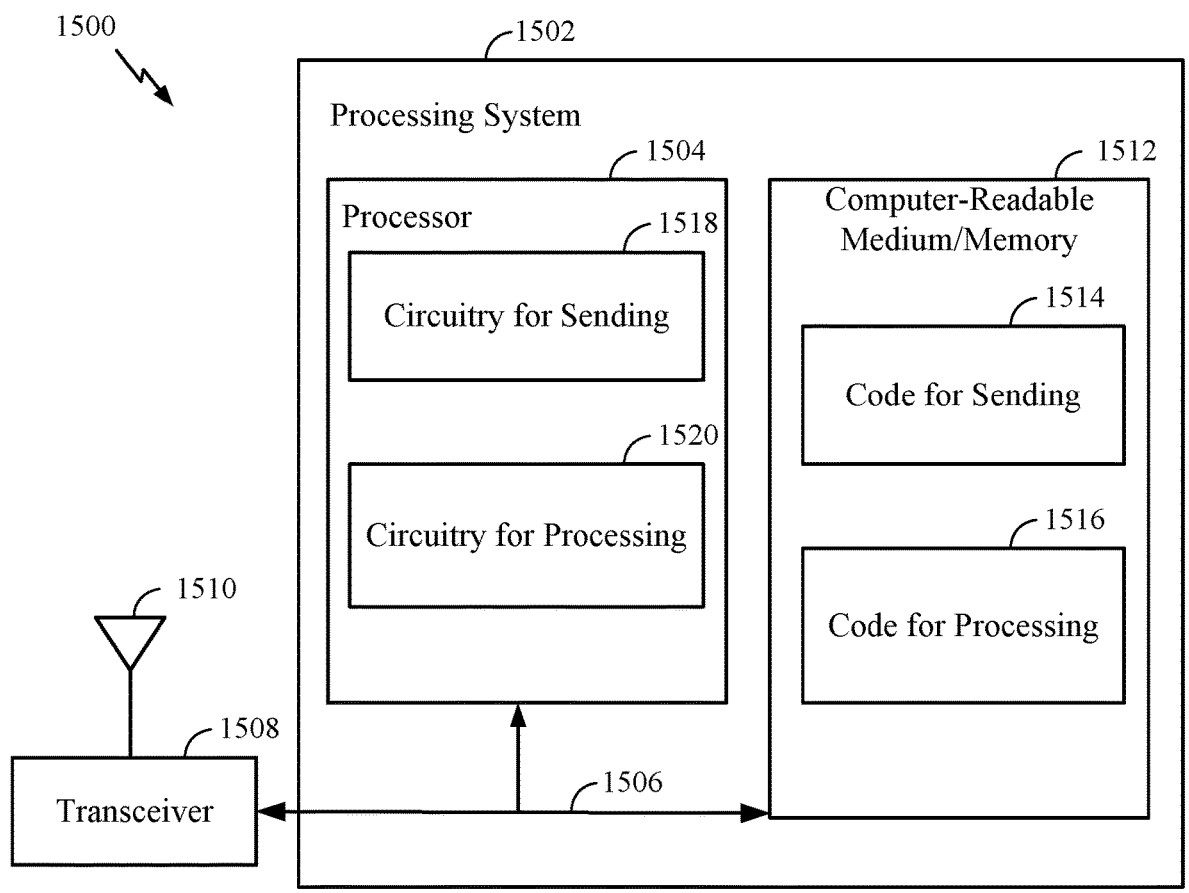
FIG. 15 illustrates a communications device that may include various components configured to perform operations for the techniques disclosed herein in accordance with aspects of the present disclosure.

FIG. 15 illustrates a communications device 1500 that may include various components (e.g., corresponding to means-plus-function components) configured to perform operations for the techniques disclosed herein, such as the operations illustrated in FIG. 12. The communications device 1500 includes a processing system 1502 coupled to a transceiver 1508 (e.g., a transmitter and/or a receiver). The transceiver 1508 is configured to transmit and receive signals for the communications device 1500 via an antenna 1510, such as the various signals as described herein. The processing system 1502 may be configured to perform processing functions for the communications device 1500, including processing signals received and/or to be transmitted by the communications device 1500.

The processing system 1502 includes a processor 1504 coupled to a computer-readable medium/memory 1512 via a bus 1506. In certain aspects, the computer-readable medium/memory 1512 is configured to store instructions (e.g., computer-executable code) that when executed by the processor 1504, cause the processor 1504 to perform the operations illustrated in FIG. 12, or other operations for performing the various techniques discussed herein for an indication to update uplink and downlink beams. In certain aspects, computer-readable medium/memory 1512 stores code 1514 for sending, to a user equipment, signaling indicating an update to a pair of transmit and receive beams used by the UE for uplink and downlink transmissions, respectively; and code 1516 for processing at least one of uplink or downlink transmissions in accordance with the update. In certain aspects, the processor 1504 has circuitry configured to implement the code stored in the computer-readable medium/memory 1512. The processor 1504 includes circuitry 1518 for sending, to a user equipment, signaling indicating an update to a pair of transmit and receive beams used by the UE for uplink and downlink transmissions, respectively; and circuitry 1520 for processing at least one of uplink or downlink transmissions in accordance with the update.

For example, means for transmitting (or means for outputting for transmission) may include a transmitter and/or an antenna(s) 434 or the BS 110*a* or the transmitter unit 454 and/or antenna(s) 452 of the UE 120*a* illustrated in FIG. 4 and/or circuitry 1518/1520 of the communication device 1500 in FIG. 15. Means for receiving (or means for obtaining) may include a receiver and/or an antenna(s) 434 of the BS 110*a* or a receiver and/or antenna(s) 452 of the UE 120*a* illustrated in FIG. 4 and/or circuitry 1518/1520 of the communication device 1500 in FIG. 15. Means for communicating may include a transmitter, a receiver or both. Means for generating, means for performing, means for determining, means for taking action, means for determining, means for coordinating, and/or means for processing may include a processing system, which may include one or more processors, such as the transmit processor 420, the TX MIMO processor 430, the receive processor 438, and/or the controller/processor 440 of the BS 110*a* or the receive processor 458, the transmit processor 464, the TX MIMO processor 466, and/or the controller/processor 480 of the UE 120*a* illustrated in FIG. 4 and/or the processing system 1502 of the communication device 1500 in FIG. 15.

Example Aspects

Aspect 1. A method for wireless communications performed by a user equipment (UE), comprising receiving, from a network entity, signaling indicating an update to a pair of transmit and receive beams used by the UE for uplink and downlink transmissions, respectively, and processing at least one of uplink or downlink transmissions in accordance with the update.

Aspect 2. The method of Aspect 1, wherein the signaling comprises a single downlink control information (DCI) or media access control (MAC) control element (CE) that indicates an update to the receive beam via a downlink transmission configuration indicator (TCI) ID of one or more target downlink signals, and an update to the transmit beam via an uplink spatial relation ID or an uplink TCI ID of one or more target uplink signals.

Aspect 3. The method of Aspect 2, wherein the target downlink signals comprise at least one of a physical downlink shared channel (PDSCH), a physical downlink control channel (PDCCH), or a channel state information (CSI) reference signal (CSI-RS), and the target uplink signals comprise at least one of a physical uplink shared channel (PUSCH), a physical uplink control channel (PUCCH), a sounding reference signal (SRS), or a physical random access channel (PRACH).

Aspect 4. The method of any of Aspects 2 and 3, wherein the single DCI or MAC CE indicates both an ID of the receive beam and an ID of the transmit beam.

Aspect 5. The method of any of Aspects 2-4, further comprising receiving signaling indicating a downlink TCI ID and UL beam ID are grouped together and assigned a group ID, wherein the DCI or MAC CE indicates the group ID.

Aspect 6. The method of any of Aspects 1-5, wherein the signaling comprises a downlink control information (DCI) that updates a downlink transmission configuration indicator (TCI) of at least one reference signal (RS) resource that serves as a quasi co-location (QCL) source RS in both a downlink TCI of one or more target downlink signals and an uplink spatial relation or uplink TCI of one or more target uplink signals.

Aspect 7. The method of Aspect 6, wherein the target downlink signals comprise at least one of a physical downlink shared channel (PDSCH), a physical downlink control channel (PDCCH), or a channel state information (CSI) reference signal (CSI-RS) linked to a TCI state which indicates a beam the network entity will use to transmit the target downlink signals.

Aspect 8. The method of Aspect 7, wherein the TCI state is linked to at least one of a CSI-RS, synchronization signal block (SSB), or sounding reference signal that serves as a source RS of the TCI.

Aspect 9. The method of any of Aspects 6 and 7, wherein the target uplink signals comprise at least one of a physical uplink shared channel (PUSCH) or a physical uplink control channel (PUCCH) linked to a TCI state which indicates a beam the network entity will use to transmit one or more source reference signals.

Aspect 10. The method of Aspect 9, wherein the TCI state is linked to at least one of a CSI-RS, synchronization signal block (SSB), or sounding reference signal that serves as a source RS of the TCI.

Aspect 11. The method of any of Aspects 1-10, wherein the signaling comprises at least one of a downlink control information (DCI), radio resource control (RRC) signaling, or media access control (MAC) control element (CE) that updates a common beam for a set of downlink and uplink resources.

Aspect 12. The method of Aspect 11, wherein the group of downlink and uplink resources is indicated via at least one of RRC signaling, MAC CE, or a DCI.

Aspect 13. The method of any of Aspects 11 and 12, wherein the group of downlink and uplink resources is identified by at least one of a group ID or a resource ID whose beam serves as the common beam for resources having the same resource ID.

Aspect 14. The method of any of Aspects 1-13, wherein the signaling is provided via a wake up signal (WUS), and the UE is configured to apply the update in one or more ON durations after the WUS.

Aspect 15. The method of any of Aspects 1-14, further comprising sending signaling, to the network entity, indicating capability of the UE to support update to the pair of transmit and receive beams according to one or more options, and receiving signaling, from the network entity, indicating enablement of one or more of the options.

Aspect 16. The method of Aspect 15, wherein the enablement is signaled via at least one of radio resource control (RRC) signaling, media access control (MAC) control element (CE), or a downlink control information (DCI).

Aspect 17. A method for wireless communications performed by a network entity, comprising sending, to a user equipment, signaling indicating an update to a pair of transmit and receive beams used by the UE for uplink and downlink transmissions, respectively, and processing at least one of uplink or downlink transmissions in accordance with the update.

Aspect 18. The method of Aspect 17, wherein the signaling comprises a single DCI or MAC CE that indicates an update to the receive beam via a downlink TCI ID of one or more target downlink signals, and an update to the transmit beam via an uplink spatial relation ID or an uplink TCI ID of one or more target uplink signals.

Aspect 19. The method of Aspect 18, wherein the target downlink signals comprise at least one of a PDSCH, a PDCCH, or a CSI RS, and the target uplink signals comprise at least one of a PUSCH, a PUCCH, a SRS, or a PRACH.

Aspect 20. The method of any of Aspects 18 and 19, wherein the single DCI or MAC CE indicates both an ID of the receive beam and an ID of the transmit beam.

Aspect 21. The method of any of Aspects 18-20, further comprising transmitting signaling, to the UE, indicating a downlink TCI ID and UL beam ID are grouped together and assigned a group ID, wherein the DCI or MAC CE indicates the group ID.

Aspect 22. The method of Aspect 17-21, wherein the signaling comprises a DCI that updates a downlink TCI of at least one RS resource that serves as a QCL source RS in both a downlink TCI of one or more target downlink signals and an uplink spatial relation or uplink TCI of one or more target uplink signals.

Aspect 23. The method of Aspect 22, wherein the target downlink signals comprise at least one of a PDSCH, PDCCH, or a CSI RS linked to a TCI state which indicates a beam the network entity will use to transmit the target downlink signals.

Aspect 24. The method of Aspect 23, wherein the TCI state is linked to at least one of a CSI-RS, SSB, or sounding reference signal that serves as a source RS of the TCI.

Aspect 25. The method of any of Aspects 22 and 23, wherein the target uplink signals comprise at least one of a PUSCH or a PUCCH linked to a TCI state which indicates a beam the network entity will use to transmit one or more source reference signals.

Aspect 26. The method of Aspect 25, wherein the TCI state is linked to at least one of a CSI-RS, SSB, or sounding reference signal that serves as a source RS of the TCI.

Aspect 27. The method of any of Aspects 17-26, wherein the signaling comprises at least one of a DCI, RRC signaling, or MAC CE that updates a common beam for a set of downlink and uplink resources.

Aspect 28. The method of Aspect 27, wherein the group of downlink and uplink resources is indicated via at least one of RRC signaling, MAC CE, or a DCI.

Aspect 29. The method of any of Aspect 27 and 28, wherein the group of downlink and uplink resources is identified by at least one of a group ID or a resource ID whose beam serves as the common beam for resources having the same resource ID.

Aspect 30. The method of any of Aspects 17-29, wherein the signaling is provided via a WUS, and the UE is configured to apply the update in one or more ON durations after the WUS.

Aspect 31. The method of any of Aspects 17-30, further comprising receiving signaling, from the UE, indicating capability of the UE to support update to the pair of transmit and receive beams according to one or more options, and sending signaling, to the UE, indicating enablement of one or more of the options.

Aspect 32. The method of Aspect 31, wherein the enablement is signaled via at least one of RRC signaling, MAC CE, or a DCI.

Aspect 33. An apparatus for wireless communication comprising a memory and one or more processors coupled to the memory, the one or more processors and the memory being configured to receive, from a network entity, signaling indicating an update to a pair of transmit and receive beams used by the UE for uplink and downlink transmissions, respectively, and processes at least one of uplink or downlink transmissions in accordance with the update.

Aspect 34. An apparatus for wireless communication comprising a memory and one or more processors coupled to the memory, the one or more processors and the memory being configured to send, to a user equipment, signaling indicating an update to a pair of transmit and receive beams used by the UE for uplink and downlink transmissions, respectively, and process at least one of uplink or downlink transmissions in accordance with the update.

Aspect 35. A computer readable medium having computer executable code stored thereon, comprising code for receiving, from a network entity, signaling indicating an update to a pair of transmit and receive beams used by the UE for uplink and downlink transmissions, respectively, and code for processing at least one of uplink or downlink transmissions in accordance with the update.

Aspect 36. A computer readable medium having computer executable code stored thereon comprising code for sending, to a user equipment, signaling indicating an update to a pair of transmit and receive beams used by the UE for uplink and downlink transmissions, respectively, and code for processing at least one of uplink or downlink transmissions in accordance with the update.

Aspect 37. An apparatus comprising means for receiving, from a network entity, signaling indicating an update to a pair of transmit and receive beams used by the UE for uplink and downlink transmissions, respectively, and means for processing at least one of uplink or downlink transmissions in accordance with the update.

Aspect 38. An apparatus for wireless communication comprising means for sending, to a user equipment, signaling indicating an update to a pair of transmit and receive beams used by the UE for uplink and downlink transmissions, respectively, and means for processing at least one of uplink or downlink transmissions in accordance with the update.

Additional Considerations

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, a digital signal processor (DSP), an application specific integrated circuit (ASIC), or a processor (e.g., a general purpose or specifically programmed processor). Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a DSP, an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIG. 11 and/or FIG. 12.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications performed by a user equipment (UE), comprising:
    receiving, from a network entity, signaling indicating a simultaneous update having a first update to a transmit beam used by the UE for an uplink transmission and a second update to a receive beam used by the UE for a downlink transmission, wherein:
        the signaling comprises downlink control information (DCI) and a media access control (MAC) control element (CE);
        the signaling updates a common beam for a set of downlink and uplink resources; and
        the signaling further indicates:
            the first update to the transmit beam via an uplink spatial relation ID of one or more target uplink signals; and
            the second update to the receive beam via a downlink transmission configuration indicator (TCI) ID of one or more target downlink signals; and
    performing the simultaneous update by applying the first update to the uplink transmission and applying the second update to the downlink transmission.

2. The method of claim 1, wherein:
    the target downlink signals comprise at least one of a physical downlink shared channel (PDSCH), a physical downlink control channel (PDCCH), or a channel state information (CSI) reference signal (CSI-RS); and
    the target uplink signals comprise at least one of a physical uplink shared channel (PUSCH), a physical uplink control channel (PUCCH), a sounding reference signal (SRS), or a physical random access channel (PRACH).

3. The method of claim 1, wherein the signaling further indicates both an ID of the receive beam and an ID of the transmit beam.

4. The method of claim 1, further comprising receiving a grouping indication indicating the downlink TCI ID and a UL beam ID are grouped together and assigned a group ID, wherein the signaling further indicates the group ID.

5. The method of claim 1, wherein the signaling updates a downlink transmission configuration indicator (TCI) of at least one reference signal (RS) resource, wherein:
    the at least one RS resource serves as a quasi co-location (QCL) source RS in both a second downlink TCI associated with the one or more target downlink signals, and an uplink spatial relation; or
    the at least one RS resource serves as a QCL source RS in an uplink TCI associated with the one or more target uplink signals.

6. The method of claim 5, wherein;
    the at least one RS resource serves as the QCL RS in both the second downlink TCI associated with the one or more target downlink signals, and the uplink spatial relation; and
    the target downlink signals are linked to a TCI state which indicates a beam the network entity will use to transmit the target downlink signals and comprise at least one of a physical downlink shared channel (PDSCH), a physical downlink control channel (PDCCH), or a channel state information (CSI) reference signal (CSI-RS).

7. The method of claim 6, wherein the TCI state is linked to at least one of a CSI-RS, synchronization signal block (SSB), or sounding reference signal, wherein the at least one of the CSI-RS, the SSB, or the sounding reference signal serves as a source RS of the TCI.

8. The method of claim 5, wherein:
    the at least one RS resource serves as the QCL source RS in the uplink TCI associated with the one or more target uplink signals; and
    the target uplink signals comprise at least one of a physical uplink shared channel (PUSCH) or a physical uplink control channel (PUCCH) linked to a TCI state which indicates a beam the network entity will use to transmit one or more source reference signals.

9. The method of claim 8, wherein the TCI state is linked to at least one of a CSI-RS, synchronization signal block (SSB), or sounding reference signal, wherein the at least one of the CSI-RS, the SSB, or the sounding reference signal serves as a source RS of the TCI.

10. The method of claim 1, wherein:
    the signaling is provided via a wake up signal (WUS); and
    the UE is configured to apply the simultaneous update in one or more ON durations after the WUS.

11. The method of claim 1, further comprising:
    sending a capability indication, to the network entity, indicating capability of the UE to support, according to one or more options, the first update to the transmit beam and the second update to the receive beam; and
    receiving an enablement indication, from the network entity, indicating enablement of one or more of the options.

12. A method for wireless communications performed by a network entity, comprising:
    sending, to a user equipment (UE), signaling indicating a simultaneous update having a first update to a transmit beam used by the UE for an uplink transmission and a second update to a receive beam used by the UE for downlink transmission, wherein:
        the signaling comprises downlink control information (DCI) and a media access control (MAC) control element (CE);

the signaling updates a common beam for a set of downlink and uplink resources; and the signaling further indicates:

the first update to the transmit beam via an uplink spatial relation ID of one or more target uplink signals; and the second update to the receive beam via a downlink transmission configuration indicator (TCI) ID of one or more target downlink signals; and performing the simultaneous update by applying the first update to the uplink transmission and applying the second update to the downlink transmission.

13. The method of claim 12, wherein:

the target downlink signals comprise at least one of a physical downlink shared channel (PDSCH), a physical downlink control channel (PDCCH), or a channel state information (CSI) reference signal (CSI-RS); and the target uplink signals comprise at least one of a physical uplink shared channel (PUSCH), a physical uplink control channel (PUCCH), a sounding reference signal (SRS), or a physical random access channel (PRACH).

14. The method of claim 12, wherein the signaling further indicates both an ID of the receive beam and an ID of the transmit beam.

15. The method of claim 12, further comprising transmitting a grouping indication, to the UE, indicating the downlink TCI ID and a UL beam ID are grouped together and assigned a group ID, wherein the signaling further indicates the group ID.

16. The method of claim 12, wherein the signaling updates a downlink transmission configuration indicator (TCI) of at least one reference signal (RS) resource, wherein:

the at least one RS resource serves as a quasi co-location (QCL) source RS in both a second downlink TCI associated with the one or more target downlink signals, and an uplink spatial relation; or the at least one RS resource serves as a QCL source RS in an uplink TCI associated with the one or more target uplink signals.

17. The method of claim 16, wherein:

the at least one RS resource serves as the QCL RS in both the second downlink TCI associated with the one or more target downlink signals, and the uplink spatial relation; and the target downlink signals are linked to a TCI state which indicates a beam the network entity will use to transmit the target downlink signals and comprise at least one of a physical downlink shared channel (PDSCH), a physical downlink control channel (PDCCH), or a channel state information (CSI) reference signal (CSI-RS).

18. The method of claim 17, wherein the TCI state is linked to at least one of a CSI-RS, synchronization signal block (SSB), or sounding reference signal, wherein the at least one of the CSI-RS, the SSB, or the sounding reference signal serves as a source RS of the TCI.

19. The method of claim 16, wherein:

the at least one RS resource serves as the QCL source RS in the uplink TCI associated with the one or more target uplink signals; and the target uplink signals comprise at least one of a physical uplink shared channel (PUSCH) or a physical uplink control channel (PUCCH) linked to a TCI state which indicates a beam the network entity will use to transmit one or more source reference signals.

20. The method of claim 19, wherein the TCI state is linked to at least one of a CSI-RS, synchronization signal block (SSB), or sounding reference signal, wherein the at least one of the CSI-RS, the SSB, or the sounding reference signal serves as a source RS of the TCI.

21. The method of claim 12, wherein:

the signaling is provided via a wake up signal (WUS); and the UE is configured to apply the simultaneous update in one or more ON durations after the WUS.

22. The method of claim 12, further comprising:

receiving a capability indication, from the UE, indicating capability of the UE to support, according to one or more options, the first update to the transmit and the second update to the receive beam; and sending an enablement indication, to the UE, indicating enablement of one or more of the options.

23. A processing system for wireless communication by a relay node, comprising:

one or more processors individually or collectively configured to execute instructions stored on one or more memories and to cause the relay node to:

receive, from a network entity, signaling indicating a simultaneous update having a first update to a transmit beam used by a user equipment (UE) for an uplink transmission and a second update to a receive beam used by the UE for downlink transmission, wherein:

the signaling comprises downlink control information (DCI) and a media access control (MAC) control element (CE);

the signaling updates a common beam for a set of downlink and uplink resources; and the signaling further indicates:

the first update to the transmit beam via an uplink spatial relation ID of one or more target uplink signals; and the second update to the receive beam via a downlink transmission configuration indicator (TCI) ID of one or more target downlink signals; and perform the simultaneous update by applying the first update to the uplink transmission and applying the second update to the downlink transmission.

24. A processing system for wireless communication by a relay node, comprising:

one or more processors individually or collectively configured to execute instructions stored on one or more memories and to cause the relay node to:

send, to a user equipment (UE), signaling indicating a simultaneous update having a first update to a transmit beam used by the UE for an uplink transmission and a second update to a receive beam used by the UE for a downlink transmission, wherein:

the signaling comprises downlink control information (DCI) and a media access control (MAC) control element (CE);

the signaling updates a common beam for a set of downlink and uplink resources; and the signaling further indicates:

the first update to the transmit beam via an uplink spatial relation ID of one or more target uplink signals; and the second update to the receive beam via a downlink transmission configuration indicator (TCI) ID of one or more target downlink signals; and perform the simultaneous update by applying the first update to the uplink and applying the second update to the downlink transmission.

\* \* \* \* \*